United States Patent [19]
Härtel et al.

[11] Patent Number: 5,221,078
[45] Date of Patent: Jun. 22, 1993

[54] METHOD FOR VARYING THE SPRING RIGIDITY OF AN ELASTOMER MOUNT, AND CORRESPONDING ELASTIC MOUNT

[75] Inventors: Volker Härtel, Germering; Matthias Richter, Inning; Gerhard Höglinger, Rosenheim, all of Fed. Rep. of Germany

[73] Assignee: Metzeler Gimetall AG, Munich, Fed. Rep. of Germany

[21] Appl. No.: 777,640

[22] Filed: Oct. 15, 1991

[30] Foreign Application Priority Data

Oct. 12, 1990 [DE] Fed. Rep. of Germany ....... 4032503
Sep. 13, 1991 [DE] Fed. Rep. of Germany ....... 4130362

[51] Int. Cl.$^5$ .............................................. B60K 5/12
[52] U.S. Cl. ............................................... 267/140.14
[58] Field of Search ........... 267/35, 140.1 R, 140.1 A, 267/140.1 AE, 140.11, 140.13, 140.14, 140.15, 219, 35; 248/636, 566, 550

[56] References Cited

U.S. PATENT DOCUMENTS

| | | | |
|---|---|---|---|
| 4,415,148 | 11/1983 | Maier et al. | 267/140.1 R |
| 4,669,711 | 6/1987 | Beer | 267/140.1 AE |
| 4,793,600 | 12/1988 | Kojima | 267/140.1 AE |
| 4,871,150 | 10/1989 | Le Salver et al. | 267/140.1 A |

*Primary Examiner*—Matthew C. Graham
*Attorney, Agent, or Firm*—Herbert L. Lerner; Laurence A. Greenberg

[57] ABSTRACT

A method for varying the spring rigidity of an elastomer engine mount for motor vehicles, having two rubber bodies being at least intermittently connected in series, includes intermittently spanning one of the two series-connected rubber bodies as a function of predetermined operating parameters with rigid components of the mount by means of a separate force brought to bear from the outside. Induced forces are elastically effectively received with only the other of the two rubber bodies. An elastic engine mount, especially for motor vehicles, includes rotationally symmetrical rubber bodies disposed one above the other in series. The first rubber body is fixed between an engine mount plate and a support plate. The second rubber body is fixed between the support plate and a retaining plate to be pivoted at a vehicle body. An annular housing surrounds and partly encompasses the second rubber body. One end surface of the housing is rigidly connected to one of the plates bounding the second rubber body and the other end surface of the housing encompasses the rim of another of the plates with play. A spreading device operates between the one plate and the other plate for bringing those plates plate into contact with the housing and spanning the second rubber body.

17 Claims, 2 Drawing Sheets

METHOD FOR VARYING THE SPRING RIGIDITY OF AN ELASTOMER MOUNT, AND CORRESPONDING ELASTIC MOUNT

The invention relates to a method for varying the spring rigidity of an elastomer mount, as an engine mount for motor vehicles, having two rubber bodies that are at least intermittently connected in series, and a corresponding elastic mount.

Modern engine mounts have the task both of absorbing the various static and dynamic engine holding forces occurring during vehicle operation and damping the resultant low-frequency engine vibrations, and moreover of suppressing the transmission of acoustical vibrations that are propagated from the engine to the body and thus to the passenger compartment of a motor vehicle. Thus such mounts must have different properties, in terms of rigidity and the loss angle of damping, in the low-frequency and high-frequency ranges. In the construction of such a mount, the requirements dictate major compromises, which under may be far from optimum unfavorable conditions. Good results were previously attained when using known hydraulically damped engine mounts, which effect major damping of low-frequency vibrations and simultaneously permit purposeful decoupling of high-frequency vibrations. However, with such mounts as well, the properties in the low and high-frequency ranges cannot be adjusted independently, so that adaptation to the various required values becomes very complicated and expensive. Moreover, in such hydraulically damped engine mounts, a variation in the dynamic rigidity is generally possible only in the axial or in other words vertical direction, while in the radial direction the rigidity remains largely unchanged, so that a controlled change in rigidity that is adapted to applicable operating conditions is not possible.

It is accordingly an object of the invention to provide a method for varying the spring rigidity of an elastomer mount and a corresponding elastic mount, which overcome the hereinafore-mentioned disadvantages of the heretofore-known methods and devices of this general type and with which, based on a pure elastomer mount, a method is provided with which the spring rigidity and damping of such a mount can be varied as a function of predetermined operating parameters, in such a way that at low rpm and therefore high vibration amplitudes, particularly when idling, such a mount is relatively soft, while at higher operating rpm it is relatively hard.

In this connection, German Democratic Republic Patent No. 111.447 discloses an elastomer mount having two hollow-cylindrical rubber bodies that are connected in series with one another, each having different spring constants, and in which at heavy loads, one rubber body is compressed far enough that the housing parts surrounding it come into contact with one another, thus rendering that rubber body inactive. Although a variation in the spring rigidity of a mount of that kind is possible, nevertheless it is only possible as a function of the particular load and without any additional opportunities for intervention from outside.

With the foregoing and other objects in view there is provided, in accordance with the invention, a method for varying the spring rigidity of an elastomer engine mount for motor vehicles, having two rubber bodies being at least intermittently connected in series, which comprises intermittently spanning one of the two series-connected rubber bodies as a function of predetermined operating parameters with rigid components of the mount by means of a separate force brought to bear from the outside, in such a way that only the other of the two rubber bodies elastically effectively receives induced forces.

It is thus also possible to vary the spring rigidity of a pure rubber mount between a "soft" and a "hard" characteristic curve, depending on existing requirements and operating parameters.

In accordance with another mode of the invention, there is provided a method which comprises spanning the one rubber body as a function of engine rpm.

In accordance with a further mode of the invention, there is provided a method which comprises carrying out the spanning step by bringing two rigid housing parts into force-locking contact with one another by means of a hydraulically acted upon pressure cushion, while enclosing the one rubber body or second rubber spring between the two rigid housing parts. A force-locking connection is one which connects two elements together by force external to the elements, as opposed to a form-locking connection which is provided by the shapes of the elements themselves.

In accordance with an added mode of the invention, there is provided a method which comprises carrying out the spanning step by bringing two housing parts into force-locking contact with one another by spreading with mechanical adjusting means, while enclosing the one rubber body or second spring between the two housing parts.

With the objects of the invention in view, there is also provided an elastic mount, in particular an engine mount for motor vehicles, comprising first and second rotationally symmetrical rubber bodies disposed one above the other in series; an engine mount plate; a support plate having a rim; the first rubber body being fixed between the engine mount plate and the support plate; a retaining plate to be pivoted at a vehicle body and having a rim; the second rubber body being fixed between and bounded or defined by the support plate and the retaining plate; an annular housing surrounding and partly encompassing the second rubber body, the annular housing having two end surfaces, one of the end surfaces being rigidly connected to one of the plates bounding the second rubber body, the other of the end surfaces encompassing the rim of another of the plates with play; and spreading means operating between the one plate and the other plate for bringing the one plate and the other plate into force-locking contact, installation or disposition with the housing and spanning the second rubber body.

In accordance with another feature of the invention, the second rubber body is a rotationally symmetrical hollow body.

In accordance with a further feature of the invention, the rim of the retaining plate is a raised rim, second rubber body has a lower outer periphery with an obliquely inwardly inclined annular extension or attachment having a lower surface and a vulcanized-on metal ring reaching around the raised rim of the retaining plate toward a vehicle body, and the annular housing has a top being rigidly joined to the support plate and a lower obliquely tapered rim being spaced apart at a vertical clearance from the lower surface of the annular extension.

In accordance with an added feature of the invention, the first rubber body is an upper rubber body, the second rubber body is a lower rubber body having a larger outside diameter than the first upper rubber body and a radially protruding region, and the annular housing has a bottom being rigidly joined to the retaining plate toward a vehicle body and a top with a tapered rim fitting over the radially protruding region of the second rubber body forming a vertical clearance.

In accordance with an additional feature of the invention, there is provided a flexible diaphragm fastened between the second rubber body and the retaining plate toward a vehicle body, the spreading means including a pressure cushion to be hydraulically acted upon, the pressure cushion being defined on one side by the flexible diaphragm and on the other side by the retaining plate.

In accordance with yet another feature of the invention, the retaining plate has adjustable means for feeding a hydraulic fluid.

In accordance with yet a further feature of the invention, the spreading means include a mechanical plunger or die disposed between the retaining plate toward a vehicle body and the second rubber body, a threaded bolt engaging the plunger, and a control motor driving the threaded bolt.

In accordance with yet an added feature of the invention, there is provided a cup-shaped flange plate secured below the retaining plate, the flange plate having a middle region carrying the control motor, the threaded bolt penetrating the flange plate and the retaining plate, and the plunger having a box-like shape with a top to be brought into force-locking contact with the second rubber body or with the support plate.

In accordance with yet an additional feature of the invention, in order to provide guidance, box-like plunger has a lower surface with two protruding ribs penetrating guide slits formed in the retaining plate.

In accordance with again another feature of the invention, the rubber bodies have Shore A hardnesses of approximately equal magnitude.

In accordance with again a further feature of the invention, the spreading means generate a spreading force to be brought to bear being greater than incident operating forces that arise in the form of a static load to be supported and dynamic operating forces. This is essential for proper operation.

In accordance with again an added feature of the invention, the force is approximately 5 bar.

In accordance with again an additional feature of the invention, in order to provide better adaptation to different conditions, the ratio between the axial and the radial rigidity of the mount is approximately 4.5.

In accordance with still another feature of the invention, the second rubber body has different radial rigidities in different transverse directions.

In accordance with a concomitant feature of the invention, the first rubber body has an elliptical cross section as seen in a plan view, or an elliptical outer contour.

Other features which are considered as characteristic for the invention are set forth in the appended claims.

Although the invention is illustrated and described herein as embodied in a method for varying the spring rigidity of an elastomer mount and a corresponding elastic mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
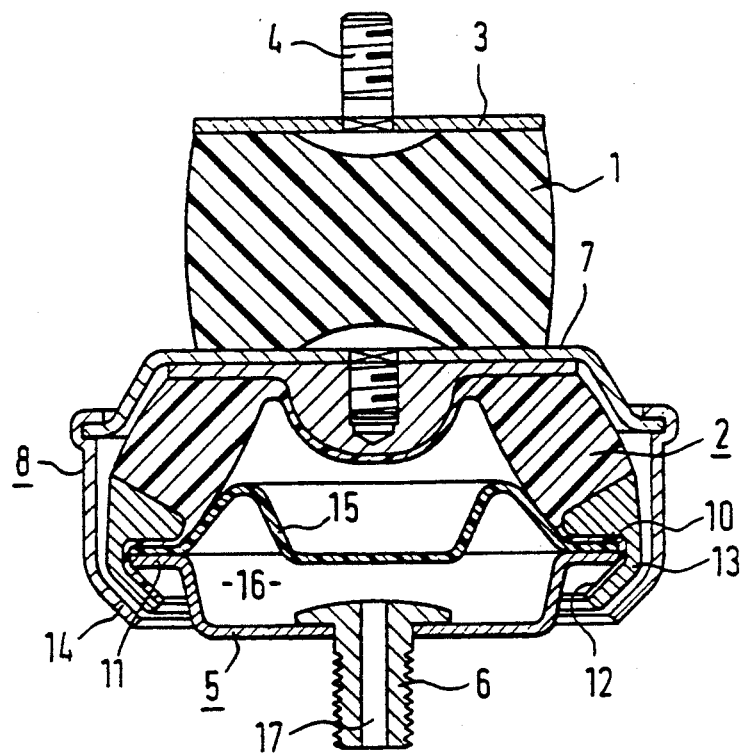
FIG. 1 is a diagrammatic, longitudinal-sectional view of an elastic mount with two rubber bodies in an effective series circuit.

Referring now to the figures of the drawing in detail and first, particularly, to FIG. 1 thereof, there is seen an elastic mount in which upper and lower rubber bodies 1 and 2 are connected in series. The upper rubber body 1 supports a mount plate 3 with a bolt 4 for a non-illustrated engine, and the lower rubber body 2 rests on a retaining plate 5, which is fixed to a vehicle body by a suitable bolt 6.

The upper rubber body 1 is in the form of a cylindrical block spring, which may have a cylindrical or elliptical outer contour as seen in a plan view. The lower end surface of the rubber body 1 is vulcanized onto a support plate 7. Upon installation, the support plate 7 is rolled into or otherwise mechanically joined to the upper rim of a cup-shaped housing 8, which encompasses the lower rubber body 2 with spacing. The lower rubber body 2 is approximately in the form of a hollow cone and has a lower base 10 which is supported on an upwardly drawn rim 11 of the retaining plate 5. The hollow-conical rubber body 2 has a lower outer periphery with an extension 12. The extension 12 is inclined obliquely inward in such a manner that it encompasses the outer rim 11 of the retaining plate 5. This extension 12 may include a metal ring 13, which optionally has a rubber overlay, and which is vulcanized onto the rubber body 2.

The housing 8 has a lower end on which a rim 14 is drawn obliquely inward, in such a way that this rim 14 extends with radial clearance with respect to the extension 12.

A corrugated flexible diaphragm 15 is fastened between the lower base 10 of the hollow-conical rubber body 2 and the rim 11 of the retaining plate 5. The diaphragm forms a fluid-tight hollow chamber 16 between itself and the retaining plate 5 and thus practically forms a hydraulic pressure cushion. The bolt 6 has a central bore 17 formed therein, by way of which a hydraulic fluid can be forced into the hollow chamber 16, as will be explained below.

In the position shown in FIG. 1, the two rubber bodies 1 and 2 are connected in series and operated jointly. It is particularly because of the hollow-conical shape of the lower rubber body 2, that a relatively soft spring characteristic results, even if both rubber bodies 1 and 2 are manufactured from a material having the same Shore hardness.

Figure 2:
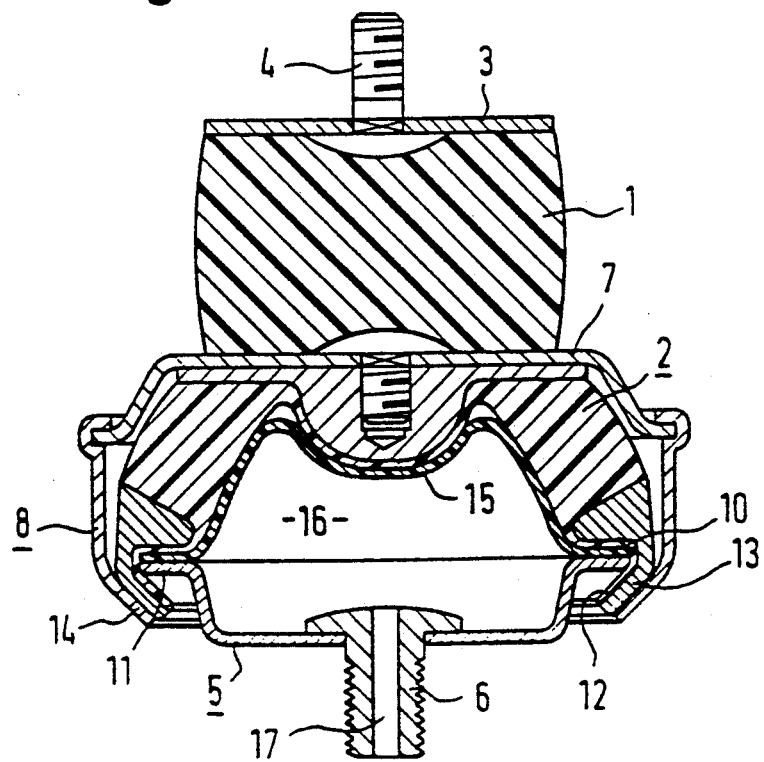
FIG. 2 is a longitudinal-sectional view of the mount with a spanning of the second rubber body by a hydraulic pressure cushion.

If hydraulic fluid is then forced into the hollow chamber 16 through the conduit 17 as shown in FIG. 2, the diaphragm 15 acts as spreading means and deflects curvingly upward, until it comes to rest against the inner contour of the hollow-conical rubber body 2. At an appropriate pressure, the spacing between the support plate 7 and the retaining plate 5 is thus increased, with a corresponding lengthening of the rubber body 2, in such a way that the rim 11 of the retaining plate 5 along with the annular extension 12 of the rubber body 2 comes to rest on the drawn-in rim 14 of the housing 8. This produces a force-locking coupling of the retaining plate 5 and the housing 8 while the pressure in the hollow chamber 16 is maintained, and the rubber body 2 is thus spanned or bypassed so that only the upper, solid rubber body 1 remains in action. The result is then a very much greater spring rigidity of the mount, with a steeper spring characteristic curve.

In order to assure a long-term, stable spanning or bridging of the lower spring body 2, the force generated by the pressure of the fluid in the hollow chamber 16 must be greater than the operating forces acting upon the mount, or in other words greater than the sum of the static load and the dynamic operating forces. A pressure of approximately 5 bar should generally suffice for this purpose.

Figure 3:
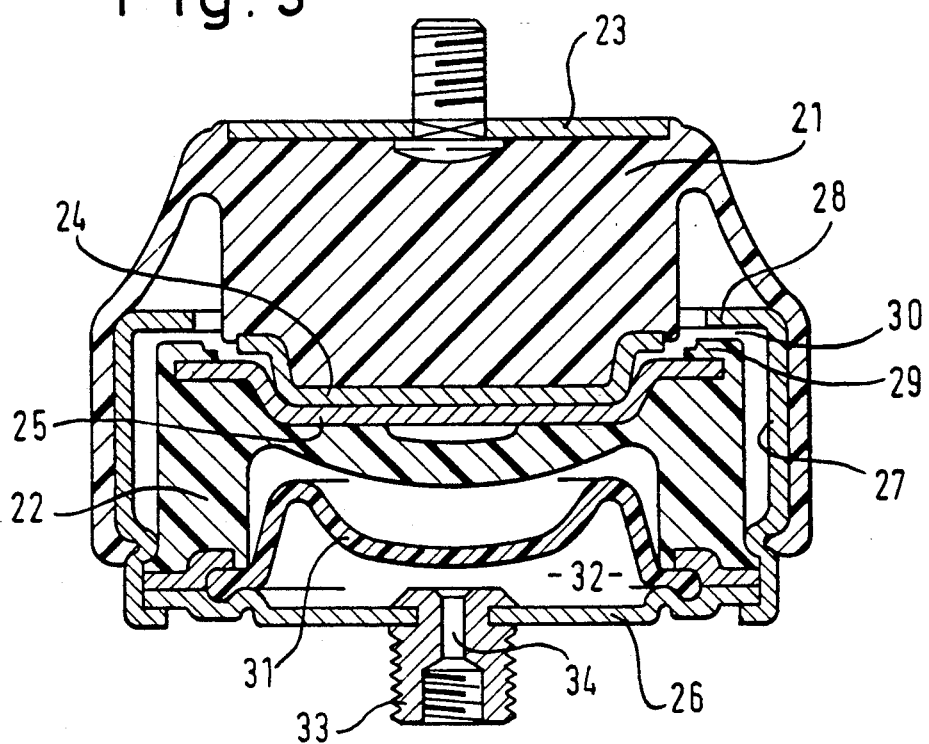
FIG. 3 is a longitudinal-sectional view of an elastic mount with a modified housing structure.

In FIG. 3, a modified construction principle of such an elastic mount is shown. Initially, a first upper cylindrical rubber body 21 is again vulcanized in, between a motor mount plate 23 and a support plate 24. A second lower rubber body 22 located under the first rubber body 21 is hollow-cylindrical and has a larger outside diameter than the upper rubber body 21. The rubber body 22 has an upper end surface which is bonded to a support plate 25, and a lower surface with a rim with which it is secured to a retaining plate 26 that is joined to the vehicle body.

The lower rubber body 22 is then surrounded by a hollow-cylindrical housing 27, which has a lower end that is joined to the retaining plate 26 and an upper end with a horizontal taper or tapered rim 28 that partly covers a protruding rim 29 of the second rubber body 22. A vertical gap 30 remains free between the taper 28 and the rim 29.

In the position shown, both rubber bodies 21 and 22 cooperate in a series circuit, having a corresponding spring characteristic curve.

As in the exemplary embodiments of FIGS. 1 and 2, a flexible, corrugated diaphragm 31 is likewise fastened between the retaining plate 26 and the second rubber body 22. The diaphragm 31 encloses a hollow chamber 32, acting as a pressure cushion, between itself and the retaining plate 26. A retaining bolt 33 likewise has a central bore 34 formed therein, through which a hydraulic fluid can be forced under pressure into the chamber 32.

When the fluid is thus forced in, the diaphragm 31 bulges upward, until it comes into contact with the surface of the second rubber body 22 or the support plate 25, and in so doing stretches the rubber body 22 until such time as the protruding rim 29 comes to rest on the taper 28 of the housing 27, thus spanning or bridging the gap 30. The second rubber body 22 is then generally spanned or bypassed by the housing 27 and rendered inactive, so that only the rubber body 21, which is the one having the greater spring rigidity, then remains in action.

Figure 4:
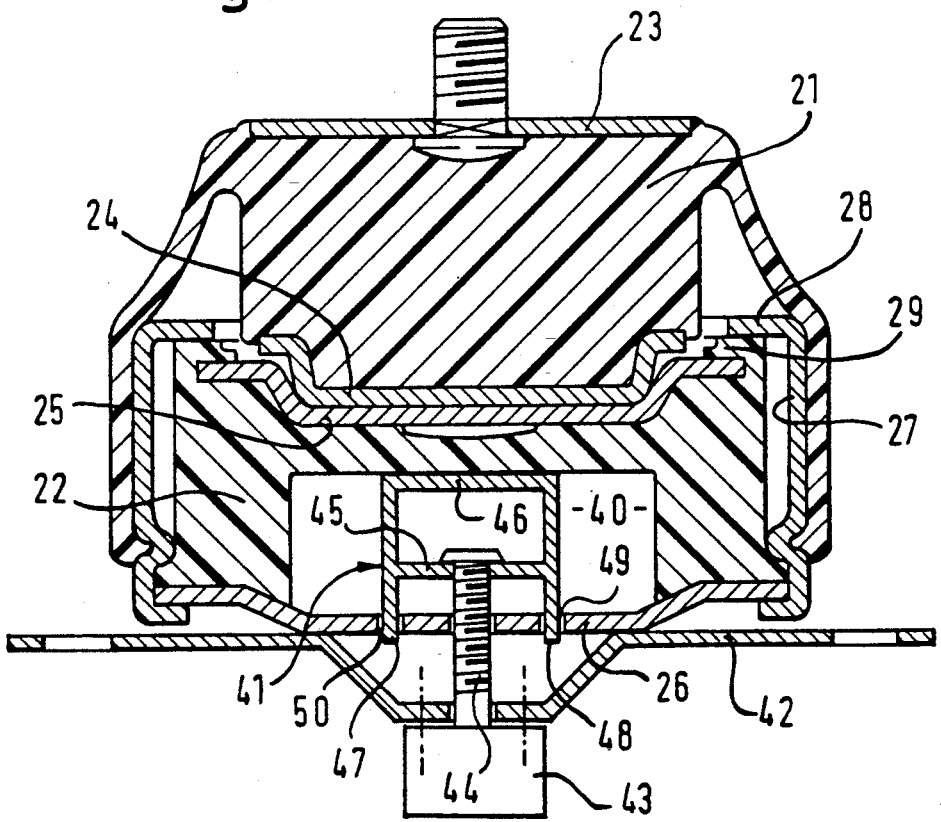
FIG. 4 is a longitudinal-sectional view of such a mount having mechanical adjusting means in the form of a box-like die.

Another option for spreading by mechanical means is shown in FIG. 4, in which the mount structure in principle corresponds to that of FIG. 3. In this case, a box-like die or plunger 41 is disposed in an inner hollow chamber 40 of the second rubber body 22, above the retaining plate 26. The die is actuated as follows. A cup-shaped flange plate 42 is secured below the retaining plate 26. The outer surface of a middle region of the flange plate 42 carries a control motor 43, from which a threaded bolt 44 penetrates the flange plate 42 and the retaining plate 26 and engages a transverse rib 45 of the box-like die 41.

When the control motor 43 is turned on and the threaded bolt 44 rotates, the die 41 can thus be moved downward or upward as spreading means, until the top 46 of the die 41 comes into force-locking contact with the second rubber body 22 or with the support plates 24, 25 and stretches the second rubber body 22 in the same way, until the gap between the protruding rim 29 and the tapered flange 28 of the housing 27 is spanned, thus rendering the second rubber body 22 inactive.

In order to provide better guidance of the die 41, it may have two protruding ribs 47 and 48 on its lower surface, which penetrate the retaining plate 26 in corresponding guide slits 29 and 50.

With such an embodiment and mode of operation of a pure rubber mount, it is accordingly possible, for instance at low rpm during idling, to obtain a soft characteristic of the mount, by connecting the two rubber bodies in series, while at operating rpm and during travel by the vehicle, a harder characteristic curve is attainable by spanning the lower spring body 2 or 22.

Given suitable geometric shaping of the two rubber bodies, these bodies may have the same Shore hardness.

Another advantage of the embodiment of this mount according to the invention is that the rigidity of the mount can vary not only in the axial or in other words vertical direction but radially as well, since the rubber bodies have a relatively large radial clearance, which is limited only by the shear resistance of the rubber. With the embodiment described above, it is thus possible to attain a ratio between the axial and radial rigidity of approximately 4.5. This has proved to be particularly favorable for supporting and mounting an engine as desired.

Moreover, a different radial rigidity in various transverse directions is possible for the lower rubber body as well. This can be attained by providing that this spring body has an elliptical outer contour as seen in a plan view, and by providing it with suitably shaped and distributed hollow chambers in its interior.

The overall result is accordingly a pure rubber mount in which the spring rigidity can be varied by simple means, and a change from a soft to a hard characteristic curve and vice versa can be made.

We claim:

1. An elastic engine mount for motor vehicles, comprising first and second rotationally symmetrical rubber bodies disposed one above the other in series; an engine mount plate; a support plate; said first rubber body being fixed between said engine mount plate and said support plate; a retaining plate to be pivoted at a vehicle body; each of said support and retaining plates having a rim; said second rubber body being fixed between and bounded by said support plate and said retaining plate; an annular housing surrounding and partly encompassing said second rubber body, said annular housing having two end surfaces, one of said end surfaces being rigidly connected to one of said support and retaining plates, the other of said end surfaces encompassing said rim of another of said support and retaining plates with play; and spreading means operating between said support plate and said retaining plate for bringing said support and retaining plates into contact with said housing so as to bridge said second rubber body.

2. The elastic mount according to claim 1, wherein said second rubber body is a rotationally symmetrical hollow body.

3. The elastic mount according to claim 2, wherein said rim of said retaining plate is a raised rim, second rubber body has a lower outer periphery with an obliquely inwardly inclined annular extension having a lower surface and a vulcanized-on metal ring reaching around said raised rim of said retaining plate toward a vehicle body, and said annular housing has a top being rigidly joined to said support plate and a lower obliquely tapered rim being spaced apart at a vertical clearance from said lower surface of said annular extension.

4. The elastic mount according to claim 2, wherein said first rubber body is an upper rubber body, said second rubber body is a lower rubber body having a larger outside diameter than said first upper rubber body and a radially protruding region, and said annular housing has a bottom being rigidly joined to said retaining plate toward a vehicle body and a top with a tapered rim fitting over said radially protruding region of said second rubber body forming a vertical clearance.

5. The elastic mount according to claim 1, including a flexible diaphragm fastened between said second rubber body and said retaining plate toward a vehicle body, said spreading means including a pressure cushion to be hydraulically loaded, said pressure cushion being defined on one side by said flexible diaphragm and on the other side by said retaining plate.

6. The elastic mount according to claim 5, wherein said retaining plate has adjustable means for feeding a hydraulic fluid.

7. The elastic mount according to claim 1, wherein said spreading means include a mechanical plunger disposed between retaining plate toward a vehicle body and said second rubber body, a threaded bolt engaging said plunger, and a control motor driving said threaded bolt.

8. The elastic mount according to claim 7, including a cup-shaped flange plate secured below said retaining plate, said flange plate having a middle region carrying said control motor, said threaded bolt penetrating said flange plate and said retaining plate, and said plunger having a box-like shape with a top to be brought into contact with said second rubber body and alternatively with said support plate.

9. The elastic mount according to claim 8, wherein said box-like plunger has a lower surface with two protruding ribs penetrating guide slits formed in said retaining plate.

10. The elastic mount according to claim 8, wherein said plunger has a pressing force of approximately 5 bar.

11. The elastic mount according to claim 10, wherein said second rubber body has an elliptical cross section as seen in a plan view.

12. The elastic mount according to claim 1, wherein said rubber bodies have Shore A hardnesses of approximately equal magnitude.

13. The elastic mount according to claim 1, wherein said spreading means generate a spreading force being greater than incident operating forces in the form of a static load to be supported and dynamic operating forces.

14. The elastic mount according to claim 1, wherein the mount has an axial and a radial rigidity in a ratio of approximately 4.5.

15. The elastic mount according to claim 1, wherein different radial rigidities of said second rubber body are functions of transverse directions in said second rubber body.

16. The elastic mount according to claim 1, wherein said first rubber body has an elliptical outer contour as seen in a plan view.

17. An elastic mount, comprising first and second rotationally symmetrical rubber bodies disposed in series; a mounting plate; a support plate having a support plate rim; said first rubber body being fixed between said mounting plate and said support plate; a retaining plate having a retaining plate rim; said second rubber body being fixed between and bounded by said support plate and said retaining plate; an annular housing surrounding and partly encompassing said second rubber body, said annular housing having two end surfaces, one of said end surfaces being rigidly connected to one of said support and retaining plates, the other of said end surfaces encompassing one of said support plate rim and retaining plate rim of another of said plates with play; and spreading means operating between said one plate and said other plate for bringing said one plate and said other plate into contact with said housing so as to bridge said second rubber body.

* * * * *